(12) United States Patent
Tabellario

(10) Patent No.: US 7,921,732 B2
(45) Date of Patent: Apr. 12, 2011

(54) METHOD AND AN APPARATUS FOR OPERATING AN ELECTROMAGNETIC VALVE ASSOCIATED TO A GAS METER

(75) Inventor: Mario Tabellario, Pescara (IT)

(73) Assignee: Alfa Centauri S.p.A., Guardiagrele (Chieti) (IT)

( * ) Notice: Subject to any disclaimer, the term of this patent is extended or adjusted under 35 U.S.C. 154(b) by 221 days.

(21) Appl. No.: 12/301,795

(22) PCT Filed: May 23, 2007

(86) PCT No.: PCT/IB2007/001326
§ 371 (c)(1),
(2), (4) Date: Nov. 21, 2008

(87) PCT Pub. No.: WO2008/139242
PCT Pub. Date: Nov. 20, 2008

(65) Prior Publication Data
US 2010/0229653 A1     Sep. 16, 2010

(30) Foreign Application Priority Data

May 25, 2006   (IT) .............................. BO2006A0403

(51) Int. Cl.
*G01F 1/58* (2006.01)
(52) U.S. Cl. .................................................... 73/861.11
(58) Field of Classification Search ............... 73/40.5 R, 73/861; 251/129.02; 137/37, 1, 614.21, 137/39; 340/635
See application file for complete search history.

(56) References Cited

U.S. PATENT DOCUMENTS

| | | | | | |
|---|---|---|---|---|---|
| 4,524,608 | A | * | 6/1985 | Bellefeuille et al. | 73/40.5 R |
| 5,145,146 | A | * | 9/1992 | Matsushima | 251/129.02 |
| 6,085,772 | A | * | 7/2000 | McGill et al. | 137/39 |
| 6,644,330 | B1 | * | 11/2003 | Chen et al. | 137/1 |
| 6,832,623 | B2 | * | 12/2004 | Johnson et al. | 137/315.06 |
| 6,953,046 | B2 | * | 10/2005 | Chen et al. | 137/39 |
| 2009/0243866 | A1 | * | 10/2009 | Murphy | 340/635 |

* cited by examiner

*Primary Examiner* — Jewel Thompson
(74) *Attorney, Agent, or Firm* — William J. Sapone; Coleman Sudol Sapone P.C.

(57) ABSTRACT

An apparatus for operating an electromagnetic valve, associated to a gas meter, and operated to stop, or allow, a flow of gas through the meter (1) includes: an electronic consumption measuring device (4), which generates in output electric signals representing the quantity of gas, which flows through the meter (1); a central unit (C), which receives in input the electric signals generated by the measuring device (4) and includes means for transmitting the data concerning the gas consumption, by electromagnetic waves. Moreover, the apparatus includes an electric, functional connection between the central unit (C) and the electromagnetic valve (3), while the central unit (C) includes also means for receiving significant data by electromagnetic waves.

14 Claims, 1 Drawing Sheet

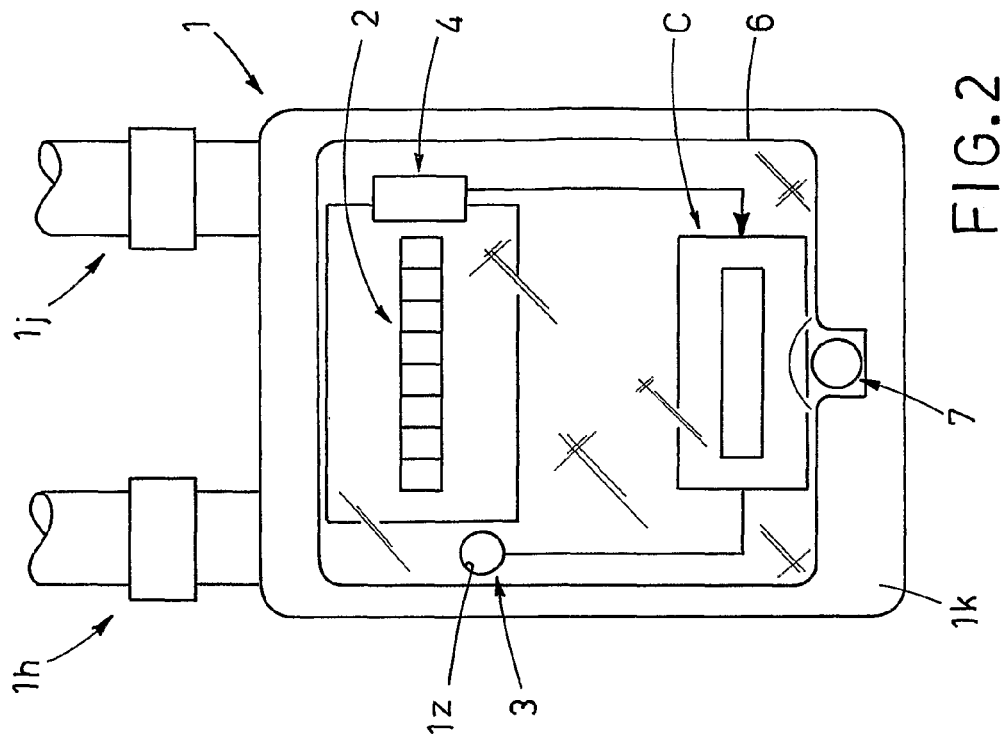
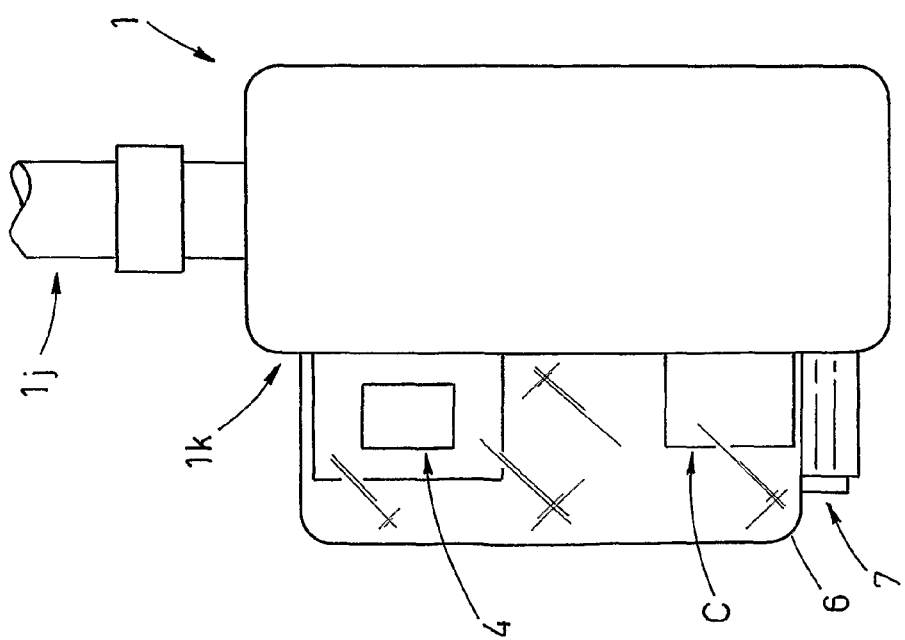

METHOD AND AN APPARATUS FOR OPERATING AN ELECTROMAGNETIC VALVE ASSOCIATED TO A GAS METER

FIELD OF THE INVENTION

The present invention relates to the technical field of the apparatuses associated to customary volumetric gas meters for civil and industrial users, aimed at measuring and periodically transmitting, by electromagnetic waves, the data related to gas consumption; in particular, the invention relates to these apparatuses associated to gas meters, which include an integrated electromagnetic valve, so as to obstruct, or allow, the passage of gas sent to the users.

DESCRIPTION OF THE PRIOR ART

Known and widespread electronic apparatuses, functionally connected to the roller digital counter of the gas meter, are aimed at detecting and storing continuously in a memory the information associated to the instant gas consumption, and at transmitting this information, periodically or when requested, to a suitable remote system, by electromagnetic waves (usually according to known GSM standard).

This type of apparatus includes: an electronic device for measuring the gas consumption, functionally connected to the roller digital counter of the meter and aimed at emitting an electric pulse for each revolution performed by the less insignificant figure roller, that is the rightmost one of the digital counter rollers; an electronic central unit, which receives in input electric pulses from the detecting device, processes them to extrapolate the information associated to the instant gas consumption (for example, beginning from an initial readout of the digit read on the counter) and stores this information in a proper memory cell, including also means for transmitting of the so stored information, by electromagnetic waves (according to the GSM standard), to a remote system.

Therefore, the memory cell is constantly updated with the representative value of the real gas consumption associated to the user, that can be traced back to the value indicated by the meter roller digital counter; obviously, this allows the provider to have a precise measurement, nearly in real time, of the actual gas consumption, that can be attributed to the user, without the necessity of the periodical intervention (for example annual) on the spot of an operator responsible for the counter reading.

The manners, in which the information is exchanged between the electronic central unit and the remote system, can for example include sending the significant data periodically or after the remote system request, by a suitable control signal; obviously, in this last case, the central unit includes also means for receiving signals by electromagnetic waves.

Moreover, some gas meters have an integrated electromagnetic valve thereinside, functionally situated between the gas meter input and output pipes, so as to stop or allow the flow of gas to the user; the electromagnetic valve is operated from the meter fore part, due to a suitable through hole made on the same wall.

The use of the electromagnetic valve is definitely an efficient alternative to the usual meter sealing with lead.

However, until today the gas companies have some handling problems, which cannot be resolved by using the above mentioned apparatuses, as described: actually, many meters are installed inside the houses, which are accessible only in the owner's/user's presence and with his/her permission; therefore, as it can be guessed, it can become fairly difficult for the company operator to reach the meter, so as to perform the operations directly thereon, such as for example "closing the gas" by sealing with lead or operating the electromagnetic valve, where present.

SUMMARY OF THE INVENTION

Therefore, the object of the present invention is to propose an apparatus, connected to a gas meter equipped with an electromagnetic valve, which allows the correct remote and/or automatic carrying out of all the electric-mechanical operations, which are necessary for the meter, such as, in particular, the electromagnetic valve operation to allow/stop the flow of gas to the users; this object is to be pursued in order to make it unnecessary for the operator to intervene in the above operations, as it occurs at present.

Another object of the present invention is to propose an apparatus for operating an electromagnetic valve associated to a gas meter, which includes a sensor for detecting gas leak into the surrounding environment, so as to stop automatically the gas flow to the user when a prefixed safety threshold is exceeded.

It is also an object of the present invention to propose such an apparatus, which respects the safety standards according to the regulations, which is reliable, functional and whose costs are relatively contained with respect to the advantages to be obtained.

Another object of the present invention is to propose a method for operating an electromagnetic valve, connected to a gas meter, which allows the correct remote and/or automatic carrying out of all the electric-mechanical operations, which are necessary for the meter, such as in particular the electromagnetic valve operation to allow/stop the flow of gas to the users; this object is to be pursued in order to make it unnecessary for the operator to intervene in the above operations, as it occurs at present.

Another object of the present invention is to propose a method for operating an electromagnetic valve associated to a gas meter, which includes a sensor for detecting gas leak into the surrounding environment, so as to stop automatically the gas flow to the user when a prefixed safety threshold is exceeded.

A further object of the present invention is to propose a method characterized by simple and essential operation steps, whose realization respects safety standards according to the regulations and whose costs are relatively contained with respect to the advantages to be obtained.

BRIEF DESCRIPTION OF THE DRAWINGS

The above mentioned objects are obtained in accordance with the contents of the claims.

The characteristic features of the invention, not appeared from what has been just said, will be better pointed out in the following, in accordance with the contents of the claims and with help of the enclosed drawing, in which:

FIG. 1 is a schematic, lateral view of the apparatus proposed by the present invention, fastened to an associated gas meter equipped with an electromagnetic valve;

FIG. 2 is a schematic, front view of the apparatus and the meter of FIG. 1.

DESCRIPTION OF THE PREFERRED EMBODIMENTS

Having regard to the enclosed drawing, the general reference numeral 1 indicates a gas meter of known type, including a roller digital counter 2 and an electromagnetic valve 3, functionally interposed between the inlet pipe 1h and the outlet pipe 1j of the gas meter 1, to stop, or allow the flow of gas to the user; the electromagnetic valve 3 is operated at the meter 1 fore wall 1k, via suitable through hole 1z made in the same wall 1k.

An electronic device 4 for measuring the gas consumption, likewise of known type and fastened to the meter 1 fore wall 1k, is functionally connected to the roller digital counter 2 and aimed at emitting an electric pulse for each revolution performed, for example, by the less significant figure roller (that is the rightmost one of the counter 2 digital rollers).

An electronic central unit C, fastened to the meter 1 fore wall 1k, is electrically connected to the electromagnetic valve 3 and to the electronic measuring device 4 (FIG. 2).

The device 4 includes means, not shown, for receiving and transmitting signals from and to a remote system (likewise not shown) by electromagnetic waves, for example according to the GSM standard.

A protective cover 6 is removably fastened, by fastening means 7, to the meter 1 fore wall 1k, so as to separate physically from outside the roller digital counter 2, the measuring device 4, the central unit C and their electric-functional connections, including the electric connection between the central unit C and the electromagnetic valve 3.

The coupling of the protective cover 6 to the fore wall 1k, such that the above mentioned separation is defined, is monitored by the central unit C by suitable sensor means (not shown), so that the removal/application of the protective cover 6 is immediately detected by the central unit C.

Moreover, the protective cover 6 is preferably made of plastic, since it is at least partially transparent, so as to allow the roller digital counter 2 readout.

The apparatus for operating the electromagnetic valve 3 associated to the gas meter 1, proposed by the present invention and described in the following, includes: the measuring device 4, the central unit C, the protective cover 6 and obviously all the related electric connections, which branch off the central unit C and connect the latter to the measuring device 4, to the electromagnetic valve 3, and to the sensor means associated to the cover 6.

In known way, the electronic central unit C receives in input electric pulses of the measuring device 4, processes them to extrapolate the information associated to the instant gas consumption (for example, beginning from an initial readout of the digit read on the counter 2) and stores this information in a memory (not shown); therefore, the memory is constantly updated with the representative value of the actual gas consumption associated to the user, that can be traced back to the value indicated by the roller digital counter 2 of the meter 1.

The representative information concerning the gas consumption can be delivered to the remote system by periodical sending of the data by the central unit C, according to an automatic procedure, or as a result of such data request by the remote system, by sending a suitable control signal.

Therefore, the remote system receives always updated data concerning the actual gas consumption measured by the roller digital counter 2; according to this data or anyway with respect to the contract relations between the user and the gas company, it is advantageously possible to control remotely, by the central unit C, the operation of the electromagnetic valve 3, so as to stop/allow the flow of gas to the user (gas closure/opening configuration, respectively).

In this way, a simple remote system distant order can cause the gas closing, by operating the electromagnetic valve 3 to the configuration, in which the flow of gas to the user is stopped; in particular, this operation is a valid alternative to the known sealing the gas meter 1 with lead and has a considerable advantage, because it does not require an operator's intervention on the spot, with all positive consequences resulting therefrom, from the economic point of view, as well as from the operational-managerial one.

Thus, the technical-functional features pointed out above, which characterize the present invention with respect to the prior art, determine a series of advantages: after having signed a prepaid gas supply contract, for example, it is possible to actuate a working procedure defined by the following steps:

sending a control signal from the remote system to the central unit C, to open the gas, or operating the electromagnetic valve 3 to the configuration, which allows the flow of gas to the user;

sending, from the remote system to the central unit C, the information which defines the volume of gas that the user can consume, according to the contract provisions;

receiving of this information by the central unit C and storing the associated data in a memory;

operating the electromagnetic valve 3, by the central unit C, to stop the flow of gas to the user when the predetermined volume of gas has been wholly consumed.

The procedure, whose above mentioned steps have simply an illustrative meaning, forms one of the advantages of the invention and demonstrates clearly the flexibility and simplicity, with which it is possible to control remotely the operation of the proposed apparatus, associated to a gas meter 1, having the electromagnetic valve 3.

Moreover, the present invention allows an advantageous use of one or more sensors for detecting gas leaks, functionally connected to the central unit C; in this way, when a given gas concentration has been exceeded in one or more environments equipped with sensors, an error state is defined in the central unit C, which advantageously operates the electromagnetic valve 3 to stop the flow of gas to the user.

Another advantage of the present invention lies in the fact that it includes the application of the protective cover 6 to the meter 1 fore wall 1k, so as to separate physically from outside the roller digital counter 2, the measuring device 4, the central unit C and their electric-functional connections, including the electric connection between the central unit C and the electromagnetic valve 3.

As specified, the sensor means, functionally connected to the central unit C, can detect the cover 6 removal; for example, an attempt to remove the protective cover 6, which is not authorized by the remote system, determines an error state, followed by the operation of the electromagnetic valve 3 to close the flow of gas to the user. Therefore, in this sense, any attempt to damage or to put the proposed apparatus or the digital counter 2 out of order, causes the immediate gas closure, just because it does require the removal of the protective cover 6.

A further advantage of the invention results from the fact that it has defined such an apparatus, which respects the safety standards according to the regulations, which is reliable, functional and whose costs are relatively contained with respect to the obtained advantages.

It is also possible that the apparatus as described above does not include the measuring device 4, so that in such case the information relevant to the actual consumption of gas could not be transmitted by the central unit C to the remote system, and this information should be obtained on the spot and communicated by an operator, or by the same user, to the distribution company, as usually done.

Besides that, all the other advantageous technical-functional features, pointed out above, which characterize the apparatus proposed by the invention, remain valid. Obviously, also this possible variant remains within the protective scope of the present invention.

The operation of the above described apparatus defines the method, likewise proposed by the present invention, for the operation of the electromagnetic valve 3, associated to the gas meter 1, whose operation steps include:

continuous measuring, by the electronic measuring device 4, of the consumption of the gas flowing through the meter 1;

storing of the information associated to such measurement in a memory of the central unit C, so that it is always updated;

transmission, by the central unit C, of the above mentioned information, periodically or when requested, to the remote system, by electromagnetic waves, for example according to known GSM standard;

transmission, by the remote system to the central unit C, of a control signal to operate the electromagnetic valve 3, so as to stop, or allow, according to the information contained in the control signal, the flow of gas through the meter 1 to the user;

receiving the control signal by the central unit C;

operating the electromagnetic valve 3 by the central unit C.

The present method includes also definition of an error state in the central unit C, when an unauthorized removal of the protective cover 6 occurs or when one or more sensors situated in one or more of environments concerned identify a gas concentration beyond a predetermined threshold; in this case, the definition of the error state is followed by the operation of the electromagnetic valve 3, by the central unit C, to stop the flow of gas to the user.

The advantages of the present method can be wholly associated and tracked back to those of the apparatus, as it is aimed at carrying out the method.

However, it is worth mentioning that the method according to the invention wholly satisfies the prefixed objects, since it is distinguished by particularly simple and essential operation steps, whose actuation respects safety standards according to the regulations and whose costs are relatively contained with respect to the obtained advantages.

It is understood that what above has been described as a not limiting example, therefore possible practical-use variants remain within the protective scope of the invention as described above and claimed below.

The invention claimed is:

1. An apparatus for operating an electromagnetic valve associated with a gas meter, said electromagnetic valve being operable for stopping or allowing a flow of gas to pass through said gas meter (1) to one or more users, said apparatus being associated with said gas meter (1) and comprising:

an electronic gas consumption measuring device (4) for generating electrical signals corresponding to a quantity of gas which flows through said meter (1);

a central unit (C) electrically connected to said electronic gas consumption measuring device for receiving and processing said electrical signals generated by said measuring device (4) for determining a quantity of gas consumed, and having means for transmitting to a remote system, by electromagnetic waves, data relevant to the quantity of gas consumed;

a functional electrical connection provided between said central unit (C) and said electromagnetic valve (3);

a protective cover (6) for protecting at least said central unit (C), said electronic measuring device (4), electrical connections between the central unit and the electronic measuring device, and said functional electrical connection provided between said electromagnetic valve (3) and said central unit (C);

said electromagnetic valve (3) being integrated with said gas meter (1) and operable through a fore wall (1k) of said gas meter, said central unit (C) and electronic measuring device (4) being fastened to said fore wall (1k) of the gas meter (1); and, wherein the protective cover is removably coupled to the fore wall (1k) for protecting from outside at least said central unit (C), said electronic measuring device (4), the electrical connections between the central unit and the electronic measuring device, and said functional electrical connection of said electromagnetic valve (3) to said central unit (C), the coupling of the protective cover (6) to the fore wall (1k) being monitored by sensor means in communication with the central unit (C) such that the central unit detects immediately when the protective cover (6) is removed.

2. The apparatus of claim 1 wherein said central unit (C) further comprises means for receiving data by electromagnetic waves.

3. The apparatus according to claim 1 further comprising a roller digital counter (2) for said gas meter (1), fastened to said fore wall (1k) of said gas meter, and being at least partially transparent, so as to allow viewing of the roller digital counter (2) readout through said protective cover (6).

4. The apparatus according to claim 1 wherein said protective cover (6) is fastened to said fore wall (1k) of the gas meter (1) by removable fastening means (7).

5. The apparatus according to claim 1 wherein the removal of the protective cover detected by the central unit (C) defines an error status.

6. The apparatus according to claim 5 wherein said central unit (C) responds to said error status by closing said electromagnetic valve (3) to stop the gas from flowing through said gas meter (1).

7. The apparatus according to claim 1 further comprising one or more sensors for detecting gas leaks in one or more environments, said sensors communicating with said central unit (C) and defining an errors status in case a given gas concentration is exceeded in at least one of said environments.

8. The apparatus according to claim 7 wherein said central unit (C) responds to said error status by closing said electromagnetic valve (3) to stop the gas from flowing through said gas meter (1).

9. A method for operating an electromagnetic valve, associated with a gas meter, said electromagnetic valve (3) being operable to stop or allow a flow of gas through said gas meter (1) to one or more users, said method comprising:

providing a central unit (C);

providing an electronic measuring device for measuring consumption of said gas flowing through the gas meter and transmitting the measured gas consumption to said central unit;

storing the measured gas consumption information;

transmitting said gas consumption information from the central unit (C) to a remote system by electromagnetic waves;

transmitting control signals from said remote system to the central unit (C) for directing the central unit to operate the electromagnetic valve (3), so as to stop or allow the flow of gas through the gas meter (1) to the one or more users;

providing a protective cover for protecting at least said central unit (C), said electronic measuring device (4), electrical connections between the central unit and the electronic measuring device, and an electrical connection provided between said electromagnetic valve (3) and said central unit (C);

integrating said electromagnetic valve (3) with said gas meter (1) for operating the electromagnetic valve through a fore wall (1*k*) of said gas meter, situating said central unit (C) and electronic measuring device (4) in a position corresponding to said fore wall (1*k*) of the gas meter (1);

removably coupling the protective cover to the fore wall (1*k*) for protecting from outside at least said central unit (C), said electronic measuring device (4), the electrical connections between the central unit and electronic measuring device, and the electrical connection between said electromagnetic valve (3) and said central unit (C); and, monitoring the coupling between the protective cover and the fore wall by said central unit, such that the central unit detects immediately when the protective cover (6) is removed.

10. The method according to claim 9 further comprising;

providing the central unit with means for receiving control signals by electromagnetic waves transmitted from a remote system;

receiving of the control signals by the central unit C; and, operating said electromagnetic valve (3) in response to the control signals received by said central unit (C).

11. The method according to claim 9 wherein removing the protective cover defines an error status indicating an unauthorized removal of the protective cover.

12. A method according to claim 11 wherein, after the definition of said error status, said central unit (C) directing said electromagnetic valve (3) to stop gas from flowing through said gas meter (1).

13. The method according to claim 9 further comprising providing one or more sensors for detecting gas leaks in one or more environments, connecting the one or more sensors to said central unit (C), and defining an error status in case a given gas concentration is exceeded in at least one of said environments.

14. The method according to claim 13 further comprising, after the defining of the error status, the central unit directing the electromagnetic valve to stop the gas flowing through said gas meter (1).

* * * * *